United States Patent

Payne et al.

[19]

[11] Patent Number: 6,010,154

[45] Date of Patent: Jan. 4, 2000

[54] TRAILER LANDING GEAR DEVICE

[76] Inventors: Christopher Kimpton Payne; George Kimpton Payne, Jr., both of 2707 Waterpoint Cir., Mt. Pleasant, S.C. 29464

[21] Appl. No.: 08/940,757

[22] Filed: Sep. 30, 1997

[51] Int. Cl.[7] .............................. B60S 9/04; B25B 13/06; B25B 13/48
[52] U.S. Cl. .................................... 280/766.1; 81/176.15; 81/124.2; 81/124.6; 279/904
[58] Field of Search .............................. 280/766.1, 763.1; 81/124.2, 176.15, 124.6, 176.2; 279/904; 254/419

[56] References Cited

U.S. PATENT DOCUMENTS

| | | | |
|---|---|---|---|
| 3,490,547 | 1/1970 | Stewart | 173/29 |
| 3,895,682 | 7/1975 | Graham | 180/313 |
| 4,273,344 | 6/1981 | Benson | 279/75 |
| 4,345,779 | 8/1982 | Busby | 280/766.1 |
| 4,400,986 | 8/1983 | Swanson et al. | 74/128 |
| 4,402,526 | 8/1983 | Huetsch | 280/434 |
| 4,585,380 | 4/1986 | Naito | 409/234 |
| 4,984,489 | 1/1991 | Krauthamer | 81/124.2 |
| 5,004,267 | 4/1991 | Busby | 280/766.1 |
| 5,012,707 | 5/1991 | DiBiagio | 81/124.2 |
| 5,287,776 | 2/1994 | Williams et al. | 81/124.2 |
| 5,299,829 | 4/1994 | Rivers, Jr. et al. | 280/766.1 |
| 5,433,850 | 7/1995 | Murray | 210/361 |
| 5,451,076 | 9/1995 | Burkhead | 280/776.1 |
| 5,542,321 | 8/1996 | Fuca | 81/125.1 |
| 5,615,587 | 1/1997 | Foerster, Jr. | 81/554 |

*Primary Examiner*—J. J. Swann
*Assistant Examiner*—Andrew J. Ririe
*Attorney, Agent, or Firm*—Harleston Law Firm; Kathleen M. Harleston

[57] ABSTRACT

This is a device for use in operating a trailer landing gear drive mechanism. The device comprises: an elongated, rigid, cylindrical body having a closed end portion which is coupleable to a rotatable drive shaft of a drive means, and an open end portion which is adapted to releasably grip the end of a crank shaft of a mechanical landing gear drive mechanism. When the drive shaft of the drive means rotates, the device rotates, causing the crank shaft of the mechanical landing gear drive mechanism to rotate, thus effecting the raising or lowering of one or more landing gear legs of a vehicle trailer. The open end of the device comprises at least one slot, which is adapted to releasably grip the end of the crank shaft. There are preferably two identical "T" shaped slots on the open end portion so that the drive speed of the landing gear drive mechanism can be selected. The closed end of the device preferably has a threaded hole which is coupleable to the rotatable drive means. This device provides semi-trailer truck owners and operators with a portable, inexpensive, quick, and efficient way to raise and lower the landing gear of trailers, with virtually no modifications to the trailer.

4 Claims, 4 Drawing Sheets

TRAILER LANDING GEAR DEVICE

BACKGROUND OF THE INVENTION

1. Technical Field

The present invention relates to a device for operating the landing gear on a trailer. More particularly, the present invention relates to a device for raising or lowering the landing gear, or legs, on a trailer prior to detachment from or after attachment to a tractor, without permanently altering the trailer.

2. Background Art

Currently, many semi-trailer truck trailers have landing gear which support the front of the trailer in the absence of a tractor during parking and storage of the trailer, and when changing trailers on the tractor. Most trailers have a set of landing gear with either pads or rollers mounted toward the front of the trailer.

Currently, many truck drivers or other users employ a manual crank system which requires the user to turn a large and unwieldy crank. Often the user turns the crank thirty (30) or more revolutions for each up or down placement of the landing gear. This is not, under normal circumstances, a difficult exercise, but it is time consuming and tiresome. Many manual landing gear systems use a two (2) speed gear mechanism which is operated by either pushing the crank handle in or pulling it out while cranking. The "fast" speed is slightly harder to turn, but takes fewer cranks than the "slow" speed which is easy to turn, but it must be turned many more revolutions than are indicated above to get results. Many semi-trailer operations require several trailer changes daily, which is particularly troublesome during inclement weather or after a long distance haul. The crank handle is loose fitting and when it is not in use, it is supposed to hang on a bracket on one of the landing gear. In many cases, the crank handle hangs loose and swings about as the semi-trailer truck is driven down the highway. Occasionally, a crank handle will fall off the trailer, creating a hazard to other motorists and an inconvenience to the truck driver who later discovers that it is missing and has no way to lower (or raise) the landing gear without locating another crank handle.

There have been several attempts in the past to develop a non-manual landing gear operating device, but these have required extensive physical changes to every trailer, and would have been prohibitively expensive for most trucking companies. Some trailers have hydraulic, air driven, or electric landing gear systems, which are costly.

The present invention provides semi-trailer truck owners and operators with a portable, inexpensive, efficient, and/or easy way to raise and lower the landing gear of trailers, with virtually no modifications to the trailer. The present device is a substantially hollow, cylindrical tool which can be mounted on one end to a reversible drive mechanism, and on the other end mates to a crank shaft which is connected to the landing gear of a trailer. The device allows the landing gear to be lowered and, when the drill is reversed, to be raised with a minimum of difficulty. The device enables a commonly available drill to be used instead of muscle-power, as in the case of a manual crank system, to quickly raise and lower the landing gear of a trailer. Thus, many trailer changes in a day are possible with minimal lost time and aggravation for the truck operator.

SUMMARY OF THE INVENTION

The present invention is a device for use in operating a trailer landing gear drive mechanism, which device comprises: an elongated, rigid, cylindrical body having a closed end portion which is coupleable to a rotatable drive shaft of a drive means, and an open end portion which is adapted to releasably grip the end of a crank shaft of a mechanical landing gear drive mechanism, such that when the drive shaft of the drive means rotates, the device rotates, causing the crank shaft of the mechanical landing gear drive mechanism to rotate; thus effecting the raising or lowering of one or more landing gear legs of a vehicle trailer; the open end of the device comprising at least one slot which is adapted to releasably grip the end of the crank shaft, and the closed end of the device comprising at least one hole or shaft which is coupleable to the rotatable drive means.

BRIEF DESCRIPTION OF THE DRAWINGS

A more complete understanding of the invention and its advantages will be apparent from the following detailed description taken in conjunction with the accompanying drawings, wherein examples of the invention are shown, and wherein.

DESCRIPTION OF THE PREFERRED EMBODIMENT

Figure 1A:
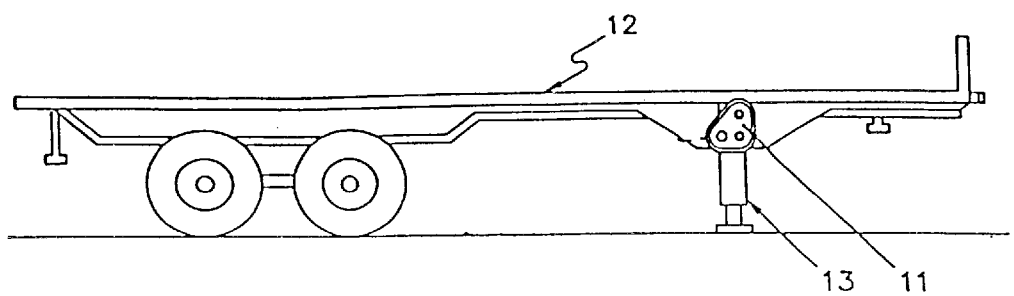
FIG. 1A is a side view of a landing gear drive mechanism with the crank removed and its relative position on a semi-trailer.

In the following description, like reference characters designate like or corresponding parts throughout the several views. Also, in the following description, it is to be understood that such terms as "open", "closed", "inside", "outside", and the like are words of convenience and are not to be construed as limiting terms. Referring in more detail to the drawings, the invention will now be described.

Figure 1B:
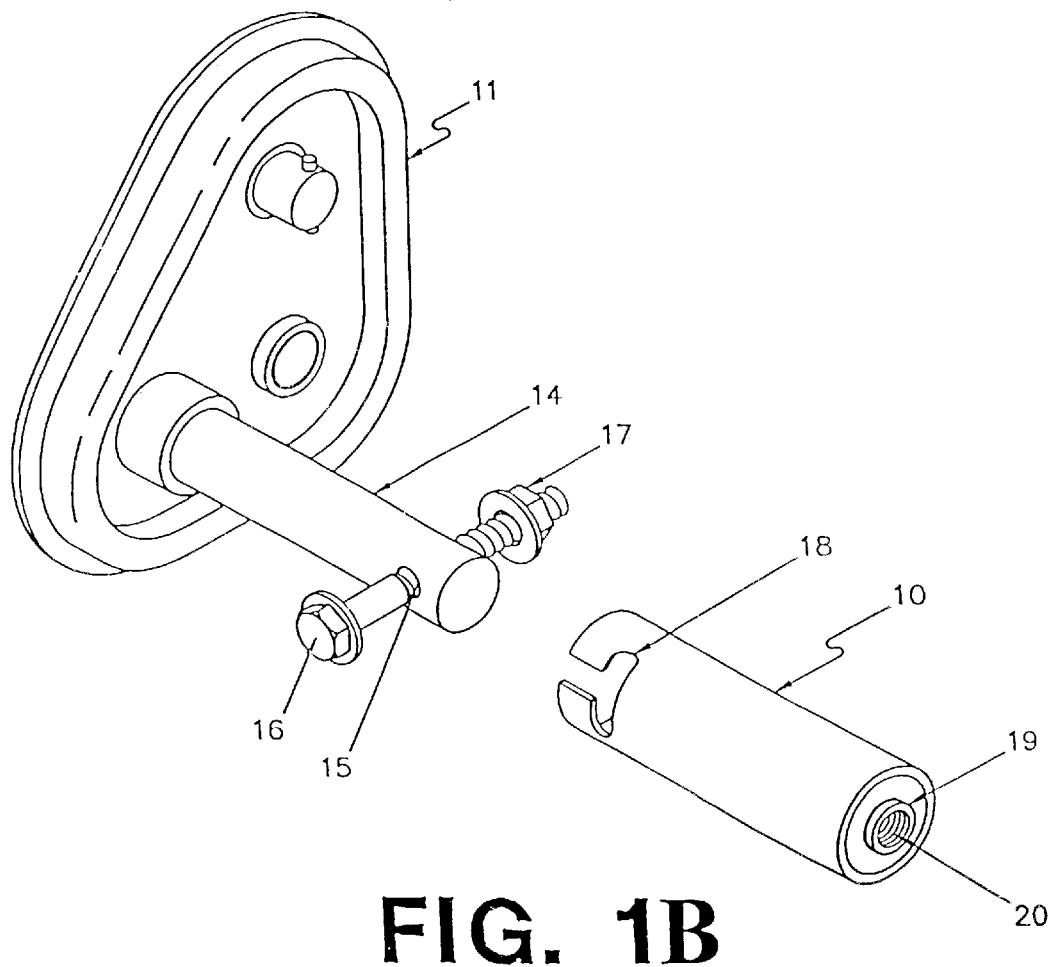
FIG. 1B is a perspective view of a trailer landing gear device according to the present invention.

Referring to FIGS. 1A and 1B, an isometric exploded parts view shows the present trailer landing gear device, which is generally designated by the reference character 10, as well as the face of a landing gear drive mechanism 11 and its relative position on a semi-trailer 12. The landing gear drive mechanism 11 is shown absent a conventional hand crank. A tractor for the semi-trailer 12 is not shown here. The semi-trailer 12 is shown parked with the landing gear legs 13 extended.

The landing gear drive mechanism 11 is preferably mechanical and operates both landing gear legs 13 on either side of a semi-trailer simultaneously. When the trailer 12 is connected to a tractor (not shown), the landing gear legs 13 are cranked up. When the trailer 12 is being readied for parking, the landing gear legs 13 are lowered to the pavement or other surface to provide support for the trailer 12 when the tractor is disconnected. The present device allows for quick, efficient trailer changes, particularly in comparison to the more tiring, tedious manual crank system presently used on many trailers. With the present system, there is no need to search for a hand crank, which may have been misplaced or fallen off the semi-truck trailer on the road. All that is needed to operate the present device is an (existing) mechanical landing gear system, a drive means such as a drill, and the device itself.

The exploded view in FIG. 1A is of the present device 10 is it approaches the crank or crank shaft 14 of the landing gear drive mechanism 11. In this view, the trailer landing gear device 10 is not mounted on a drive means, such as a drill, as it ordinarily would be during use. In regard to the landing gear drive mechanism 11, near the outside end of the crank shaft 14 is a bolt hole 15 through which is inserted a threaded crank bolt 16. The crank bolt 16 is secured to the crank shaft 14 by a self-locking nut 17.

The present device 10 comprises two T-shaped cut-outs on either side of the "open" end of the substantially hollow, cylindrical device 10. These are called "T" slots 18. At the opposite, "closed" end of the device 10 is a round machined shoulder 19 inside of which is a round, threaded drive shaft hole 20 which accommodates the drive shaft 22.

During its use for raising and lowering the landing gear legs 13, and after the manual crank, not shown, has been removed, the "T" slots 18 located on the open end of the device 10 are placed over the crank shaft 14 so that they straddle the crank bolt 16. The crank bolt 16 is secured to the crank shaft 14 by a self-locking nut 17. In this preferred embodiment, the direction of revolution of the device 10 determines whether the landing gear goes up or down. On two speed landing gear mechanisms, the crank shaft 14 is pushed in or pulled out to select the speed while cranking. The "T" slots 18 facilitate this pushing or pulling of the crank shaft 14 while it is being cranked. In contrast, "L" shaped slots would allow efficient motion in only one direction. The "T" shape of the slots allows the device to be moved efficiently in either direction. If, in a less preferred variation, a manual landing gear system had only one speed, a straight slot could be used in the open end of the present device rather than the "T" slot.

The present device 10 is comprised of any suitable, machinable, natural or synthetic material. It is preferably manufactured from metal, more preferably aluminum, plated steel, or plated iron. It can alternatively be manufactured from various types of nylon or plastic, more preferably polyvinyl chloride (PVC). It is most preferably comprised of cast aluminum, which is rust-proof and lightweight but quite sturdy.

This device 10 in conjunction with its driving system can raise or lower properly maintained two speed landing gear using the fast speed. If the landing gear has not been properly maintained, but is still operational, the present device will still raise or lower the landing gear using the low speed gearing in the trailer's landing gear system. The present device is not intended to raise the trailer from an unusual situation, such as one in which the trailer has sunk into hot pavement or mud. In such cases, it is likely that a manual crank would have to be temporarily installed. The use of this device 10 preferably does not permanently alter any manual cranking mechanism on the trailer 12 and so, should there be a need to return to the old hand crank, the manual crank system can be bolted back on, which ordinarily takes only a few minutes. To convert from the manual crank system to the system described herein, the crank bolt 16 is removed from the crank shaft 14 of the landing gear drive mechanism 11, the hand crank is removed from the crank shaft 14, and the crank bolt 16 is replaced. This quick step (which normally takes about one minute) need only be done on the initial change-over to the present system.

Figure 2:
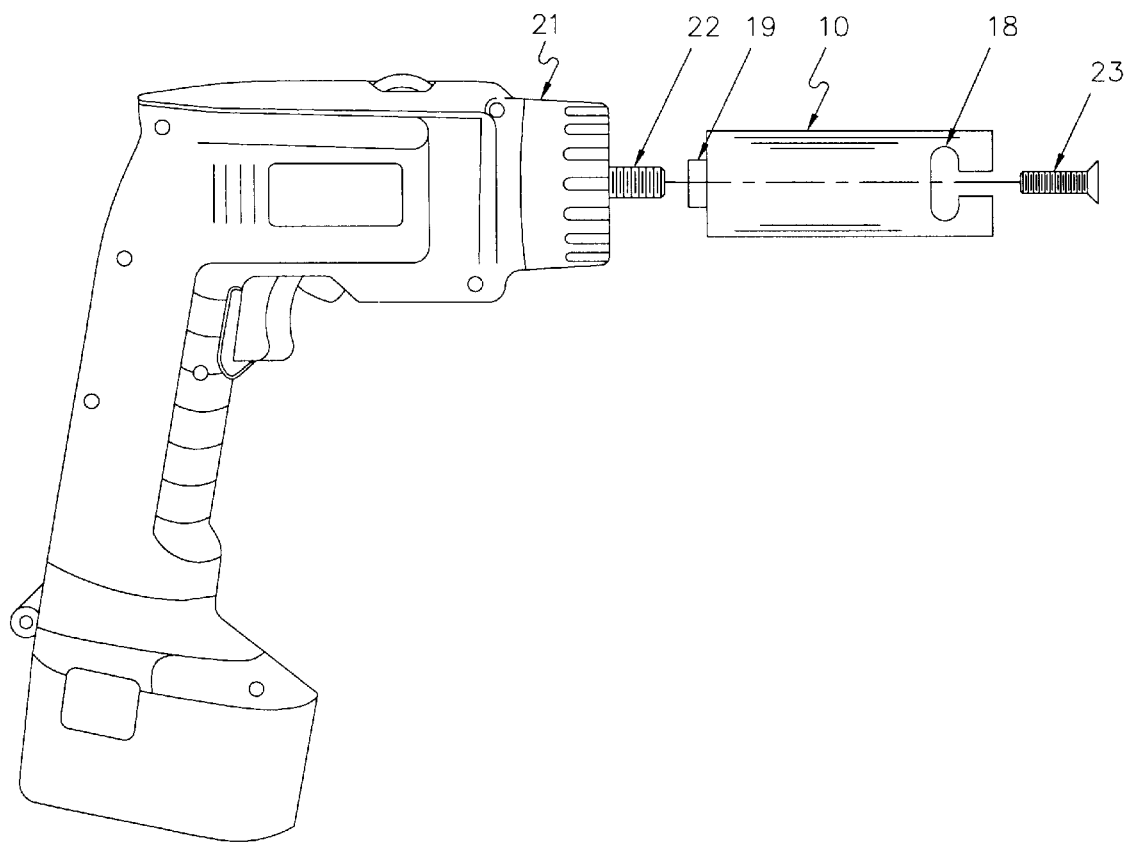
FIG. 2 is an orthographic side view of a trailer landing gear device according to the present invention, which is shown being attached to a portable drill.

FIG. 2 is an orthographic side view of the present device, which is shown being mounted on a means for driving the present device 10. Here, the drive means 21 is a portable, rechargeable, reversible drill.

As an initial step in using the trailer landing gear device 10 to raise or lower the landing gear legs 13, the closed end portion of the device 10 is threaded onto the drive shaft 22 of the drill 21 until the machined shoulder 19 on the device 10 makes contact with the base of the drill drive shaft 22. Looking from right to left in FIG. 2, a locking screw 23 is then inserted through the "open" end of the device 10, and through a non-threaded hole 24 (see FIG. 3A) into a threaded hole in the center of the drill drive shaft 22. The locking screw 23 is then tightened to keep the device 10 from unscrewing during use.

The drive means 21 is preferably any suitable, reversible, rotating drive equipment with any suitable source of power such as batteries, electricity, or compressed air. Any method of mounting may be employed, although a threaded method is preferred. In an alternative embodiment, the device comprises a shaft for mounting as a drill bit or with a square shaped hole for use similar with a socket drive tool. The drive means 21 could be powered by rechargeable batteries, or DC or AC electricity from, for example, the truck or a loading dock. The drive means 21 could be powered by air from the truck's air system, which is used to activate brakes, horn, etc. Conceivably, drive means 21 could even be powered by a hand cranked drill. The drive means 21 is preferably an air powered, reversible drill powered from the truck's air system. Alternatively, the drive means 21 is powered by a reversible electric drill in which case the tractor would be equipped with a voltage converter or rely on power at a stationary source like a loading dock.

Figure 3A:
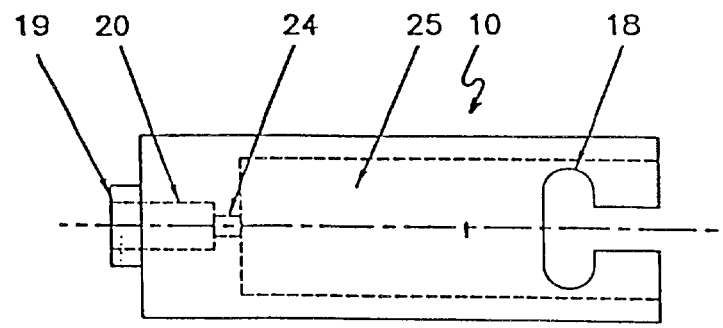
FIGS. 3A–C are plan views of the device shown in FIG. 2.
Figure 3B:
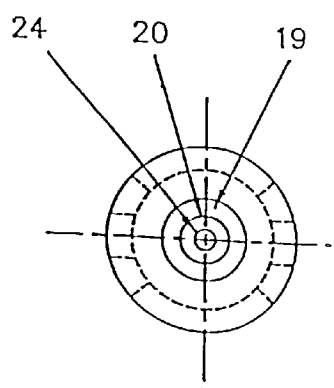
Figure 3C:
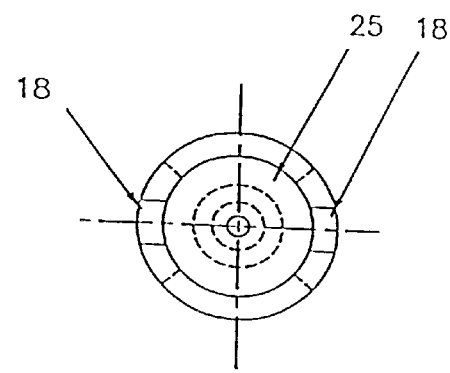

Referring to FIGS. 3A–C, an orthographic plan view of the device of FIG. 2 is shown. The view illustrates the plan views of the base (FIG. 3B), side (FIG. 3A) and top (FIG. 3C) of a device according to the present invention.

This figure shows the inside of the device 10. The "T" slots 18 straddle the crank bolt 16 in the landing gear crank shaft 14 and facilitate rotating the crank shaft 14 and also pulling or pushing the crank shaft 14 to engage the gears of a landing gear drive device, which is multi-speed in this embodiment. The machined shoulder 19 of the device 10 provides a stop for the device 10 as it is screwed onto the drive shaft 14 of the drive means 21 using the threads in the threaded drive shaft hole 20 on the device 10. The non-threaded screw hole 24 allows for the locking screw 23 to be inserted and tightened to lock the device 10 on the drive shaft 22 of the drive means 21. Much of the center of the instant cylindrical device 10 is a hollow area 25, except for the closed end ("base") which accepts the drive shaft 22 of the drive means 21. The closed end comprises the machined shoulder 19, the threaded drive shaft hole 20, and the nonthreaded screw hole 24. Plan views from the closed end ("base") and the open end ("top") of the device 10 are shown to the left and the right, respectively, as FIGS. 3B and 3C. The central axis line is also shown. The open end ("top") comprises the two identical "T" slots 18.

Figure 4:
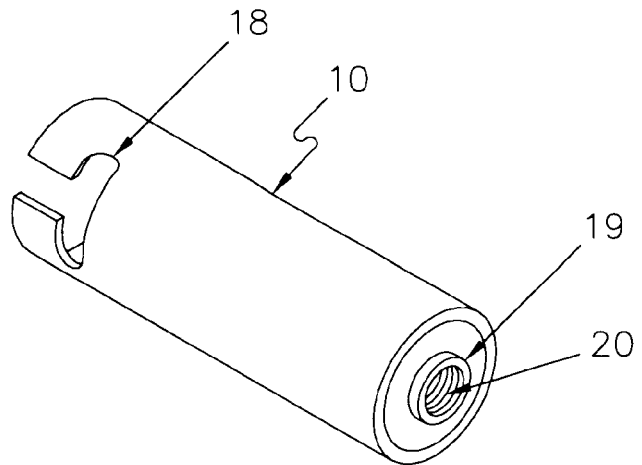
FIG. 4 is an isometric view of a trailer landing gear device according to the present invention.
Figure 5:
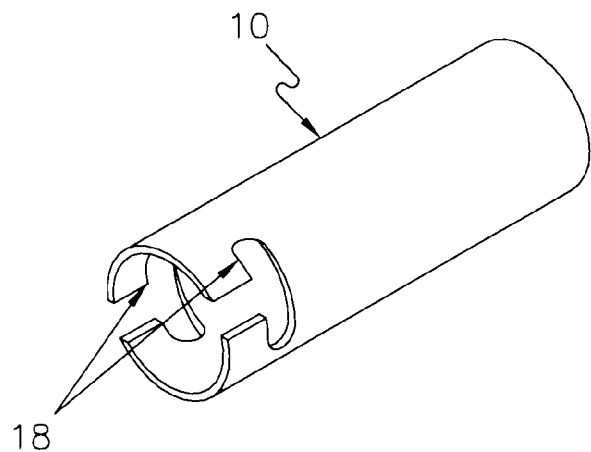
FIG. 5 is an isometric view of the opposite end of the device which is shown in FIG. 4.

Referring to FIGS. 4 and 5, isometric views from opposite ends of the same trailer landing gear device are shown. FIG. 5 shows the matching "T" slots 18 which will straddle the crank bolt 16 in the crank shaft 14, and which facilitate rotating the crank shaft 14, and also pulling or pushing the crank shaft 14 to engage the gears of a multi-speed landing gear drive device. The machined shoulder 19, which is shown in FIG. 4 and is optional, provides a stop for the device 10 as it is tightened onto the drive shaft 22 of the drive means 21 (usually a drill) using the threads in the threaded drive shaft hole 20 on the device 10.

The trailer landing gear device 10 is preferably between about 1 and 18, more preferably between about 5 and 7, inches in overall length, and preferably between about ¼ and 8, more preferably 1 and 2, inches in outside diameter. Preferably, each cut-out shape of the "T" slot 18 is between about ⅛ and 2, more preferably between about ¼ and 1, inch long, and between about ¼ and ½ inch wide. Three alternative embodiments are as follows: a) threaded to mount on the drill drive shaft 22; requires about ⅝ inch diameter machined shoulder 19 which is ⅛ inch off the main base; threads would be ⅜ inch by 24 per inch or sized to fit the drill, and ¾ inch deep with an approximately 3/16 inch hole extending through to the main cylinder of the device for the locking screw 23 to be mounted; b) variable length round or hexagonal integral shaft: and c) square drive hole, indented and centered to be used with a socket driver.

From the foregoing it can be realized that the described device of the present invention may be easily and conveniently utilized with a minimum of difficulty by truck owners and operators and others. This device is believed to answer a need in the trucking industry for a relatively inexpensive, lightweight, easy to use device for lowering and raising the landing gear on trailers. It frees the truck operator from the tedious and time-consuming manual crank system, and provides the truck/trailer owner with a low cost substitute for the manual crank system. To use the present device, no physical changes to the trailers are required other than removing the old hand crank from the landing gear drive mechanism.

While preferred embodiments of the invention have been described using specific terms, this description is for illustrative purposes only. It will be apparent to those of ordinary skill in the art that various modifications may be made without departing from the spirit or scope of the invention, and that such modifications are intended to be within the scope of the present invention.

What is claimed is:

1. A device and reversible drill, in combination, for use in operating a multi-speed trailer landing gear drive mechanism, which device comprises:

an elongated, rigid, cylindrical body having a closed end portion which is coupleable to a rotatable drive shaft of the drill, and an open end portion which is adapted to releasably grip the end of a crank shaft of a mechanical landing gear drive mechanism, such that when the drive shaft of the drill rotates, the device rotates, causing the crank shaft of the mechanical landing gear drive mechanism to rotate or when the drive shaft of the drill is moved in or out axially along the axis of rotation of the crankshaft of the landing gear drive mechanism, the device also moves in or out, causing the crankshaft of the landing gear drive mechanism to move in or out, thus effecting the raising or lowering of one or more landing gear legs of a vehicle trailer, or speed selection, the open end portion of the device comprising two identical T-shaped slots on opposite sides of the open end portion, the T-shaped slots being adapted to releasably grip the end of the crank shaft as the crank shaft rotates in either direction to raise or lower the landing gear, or pushes in or pulls out to select a speed;

the closed end portion of the device comprising at least one threaded hole or shaft, which is coupleable to the drill, so that the device stays on the drill during use and can be removed from the drill when not in use, and further comprising a machined shoulder, which provides a stop as the device is tightened onto the drive shaft of the drill; and wherein the device requires no permanent alterations to the vehicle trailer; the mechanical landing gear drive mechanism is a multi-speed manual crank system without the manual crank, which is capable of raising or lowering two landing gear legs on a vehicle trailer; and the drill drive shaft, which is threaded, is screwed into the threaded hole in the closed end portion of the device, and the device is removably locked onto the drill drive shaft by means of a locking screw which passes through a nonthreaded hole in the device and into a threaded hole in the drill drive shaft.

2. A combination according to claim 1, wherein the device, once it attached to the drill via its closed end portion and the crank shaft via its open end portion, is capable of being manually pushed in or pulled out and rotated in order to select a drive speed for the multi-speed manual crank system.

3. A combination according to claim 1, wherein the drill is battery-driven and portable.

4. A combination according to claim 1, wherein the drill is drivable by air under pressure.

* * * * *